Nov. 12, 1968     E. H. MULHOLLAND ET AL     3,410,002

EDUCATIONAL AID FOR TEACHING MATHEMATICS

Filed Oct. 24, 1966

INVENTORS
ERIC H. MULHOLLAND
BY JAMES N. BUTTERFIELD

*Elliott & Pastoriza*
ATTORNEYS

United States Patent Office 3,410,002
Patented Nov. 12, 1968

3,410,002
EDUCATIONAL AID FOR TEACHING MATHEMATICS
Eric H. Mulholland, 1727 La Flora Drive, Lake San Marcos, Calif. 92069, and James N. Butterfield, 425 S. Catalina, Los Angeles, Calif. 90005
Filed Oct. 24, 1966, Ser. No. 588,869
10 Claims. (Cl. 35—31)

ABSTRACT OF THE DISCLOSURE

An educational aid for teaching mathematics is made up of a sheet of transparent material having elongated raised portions on its top surface to define a plurality of longitudinal channels of equal length. A plurality of blocks of different lengths are dimensioned to slide in the channels. Each block has a numeral corresponding to its length visible on its upper surface so that the blocks may be positioned in end to end relationship in the channel in a manner to completely fill the channel or leave a remaining space. A base insert or baseboard having indicia visible on its surface is positionable under the transparent sheet for viewing through the sheet and enabling correlation of the visible indicia with the end positions of the blocks.

---

This invention relates generally to an educational device and more particularly to an improved educational aid for teaching elementary mathematics.

Many different types of mathematical teaching aids are known in the art and some have proved highly successful. These prior art devices range from simple elongated rods or rules having various indicia inscribed thereon to serve as number lines, to fairly sophisticated structures involving complicated frames, sliding beads or blocks such as exemplified by the well known abacus.

With such structures as are available, many problems have been encountered which have limited their use throughout educational institutions. Among such problems includes that of the physical appearance of the structure itself. In this respect, available devices can be somewhat formidable in appearance, particularly to children in grades from kindergarten to the third or fourth grade. The mechanical complexity of the device itself often raises a barrier tending to frustrate a young child.

In addition, many available teaching aids are relatively expensive with the result that one such aid may have to suffice for several children with the attendant disadvantage that each individual child cannot readily control and use the structure in a manner suited to his particular abilities.

Finally, the nature of presently available teaching aids often excludes the desirable possibility of helping grade school children grasp basic new math concepts; for example, some of the elementary propositions of basic number theory such as the radix concept of the decimal system wherein ten is the key. "Set" theory and introduction of algebraic thinking are further examples of new math concepts not easily taught to children with presently available educational aids.

With the foregoing considerations in mind, it is accordingly a primary object of the present invention to provide a vastly improved educational aid for teaching mathematics in which the above as well as many additional problems and difficulties associated with prior art devices are overcome.

More particularly, it is an object to provide a teaching aid which is extremely attractive in appearance and actually will invite close attention on the part of children all to the end that younger children, particularly those in the group from kindergarten to the third grade, may learn the various elemental rules of mathematics including new math concepts far faster and with greater ease than has been heretofore possible.

Another important object of this invention is to provide an educational aid meeting the foregoing object which is vastly less expensive to manufacture than many presently available devices with the desirable result that such aid may be provided for each child in the classroom for his own use and manipulation.

Other more general objects of this invention are to provide an educational aid for teaching mathematics in which the components of the device itself are multisensory to provide reinforcement conditions for learning abstract ideas. In this respect, there is provided a consistent, concrete, representation of numerical quantities so designed that not only can the associative, communitive, distributive, and closure laws of elementary arithmetic be easily taught, but in addition, concepts involved in set theory and algebraic thinking can be readily introduced.

Briefly, these and many other objects and advantages of this invention are attained by providing a guide means, preferably in the form of a sheet of transparent material including portions extending out of the plane of the material to define at least one longitudinal channel. In addition, there is provided a plurality of individual blocks, each of a width corresponding to the width of the channel and of a length defined by an integral multiple of a given unit length. The channel also has a length defined by an integral multiple of the given unit length, preferably greater than the length of any one of the individual blocks. With this basic arrangement, certain ones of the blocks may be positioned in end-to-end relationship in the channel in a manner to fill completely the channel or leave a remaining space equal in length to an integral multiple of the given unit length.

The preferred embodiments of the invention include, in addition to the transparent sheet and blocks, a base insert or baseboard dimensioned to be positioned under the sheet. The top surface of the base insert or baseboard includes indicia visible through the sheet which may be related to the physical positioning of the blocks in the channel.

The blocks themselves include on their top surfaces a numerical symbol equal to the integral multiple defining its length. In one embodiment of the invention, there are provided two longitudinal channels, each of length corresponding to ten times the given unit length such that the basic concept of the radix number ten for the decimal system is emphasized. In this respect, the child is taught that the "key is ten" and by manipulating the blocks in end-to-end relationship within the channel, the concept of the various integers which total ten can readily be visualized as well as tactually verified.

In a second embodiment of the invention, the transparent sheet is constructed to define eleven parallel channels, each of a length corresponding to eleven times the given unit length. The indicia board disposed beneath the transparent sheet in turn is provided with several numerals or similar indicia visible through the sheet and through the particular channels such that portions of these indicia on the board are eclipsed when blocks are positioned in the various channels. The arrangement is such that addition, subtraction, multiplication, and division operations may readily be taught. In this respect, the board containing the indicia may be turned over to expose indicia on the other side of the board.

In accord with a further feature of the invention, there may be provided thin overlay inserts containing indicia which may be positioned between the board structure and the transparent sheet to eclipse one or more of the indicia on the board or eclipse the entire board indicia and expose a different type of indicia.

Finally, each of the blocks themselves is provided with a blank bottom surface such that the blocks may be turned over and positioned in the channels and the numerical symbol designating the length of the block completely hidden. By this arrangement, various algebraic type equations may be formulated with the educational aid.

By forming the educational aid of essentially only three basic structures; to wit, a transparent sheet having raised portions defining the channels involved, a base insert having indicia on a top surface or a board having indicia on its top and bottom surfaces which is reversible and adapted to be nestled within the sheet to expose the indicia through the sheet, and a set of blocks of various lengths as described, the overall manufacturing expense is minimal. Further, the relatively flat arrangement of the sheet, insert or board, and blocks themselves results in an aid which may be readily placed on a child's desk and easily manipulated. In addition, the blocks themselves may be color coded and preferably are color coded so that the structure is attractive and a further visual sensory association is realized.

A better understanding of the invention in its preferred embodiments will be had by now referring to the accompanying drawings, in which.

Figure 1:
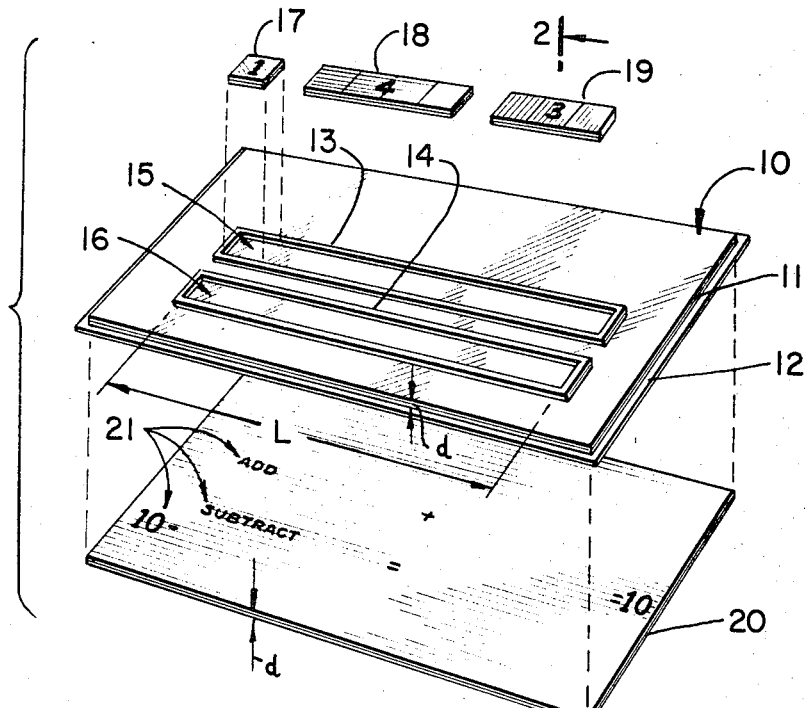
FIGURE 1 is an exploded perspective view illustrating basic components making up a first simplified embodiment of the educational aid of this invention.

Referring now to FIGURE 1, the basic components of the structure include a supporting frame preferably in the form of a transparent sheet of plastic material 10. As shown in the particular embodiment set forth, this transparent sheet includes a downwardly extending peripheral wall 11 merging into a laterally or outwardly extending peripheral flange 12. The transparent sheet structure includes a guide means formed by raised wall portions 13 and 14 extending out of the plane of the remaining portions of the sheet and shaped to define two longitudinal channels 15 and 16. These channels are of like dimensions and arranged in parallel relationship as shown.

A plurality of blocks such as indicated at 17, 18 and 19 are provided as shown in the exploded view above the channels 15 and 16. Each of these blocks has a width corresponding to the width of the channels and has a length defined by an intergral multiple of a given unit length. For example, the given unit length might be one inch. The integral multiple defining the length of the blocks illustrated in FIGURE 1 would thus be 1 for the block 17, 4 for the block 18, and 3 for the block 19. The numerical symbol representing each top surface of the integral multiple is printed on the respective blocks as shown. The blocks of different lengths are of different colors as indicated by the surface shading.

In addition to the transparent sheet 10 and set of blocks only three of which have been shown and described, there is provided an indica board 20. This board is dimensioned to fit within the confines of the downwardly extending peripheral wall 11 of the sheet 10 so that the board will be nestled within these walls and held in a stationary position relative to the top surface of the transparent sheet and thus relative to the channels 15 and 16. In this respect, the thickness $d$ of the board 20 corresponds substantially to the depth of the downwardly extending wall portion 11 also indicated at $d$ in FIGURE 1, so that the top surface of the board 20 will engage the bottom surface of the transparent sheet 10 and the bottom surface of the board 20 will be substantially flush with the laterally extending flange 12. By this arrangement, the board 20 is self-centering within the transparent sheet 10.

As shown in FIGURE 1, the board 20 includes indicia on its top surface such as indicated at 21. This indicia will be visible through the transparent sheet 10 when the various components are assembled.

Figure 2:
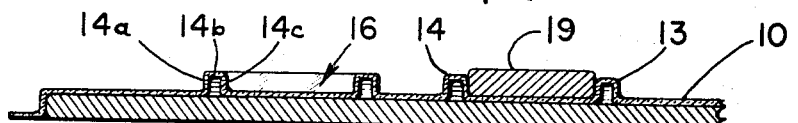
FIGURE 2 is a cross-section of the structure of FIGURE 1 in assembled relationship taken in the direction of the arrows 2—2 of FIGURE 1.

With particular reference now to FIGURE 2, it will be noted that the dimensional relationships between the board 20 and transparent sheet 10 are such as described to assure that the board 20 will not move laterally relative to the transparent sheet 10 when the board 20 is nestled within the downwardly extending peripheral wall of the sheet. In addition, it will be noted that the walls 13 and 14 defining the longitudinal channels may be formed by raising portions of the sheet itself such as indicated at 14a defining a raised side portion, 14b defining a top portion, and 14c defining an opposite side portion. The walls defining the channel are of sufficient strength to properly guide movement of the blocks when they are positioned in the channels. In addition, the sheet structure as described may very readily be formed in an economical manner by a simple vacuum-type molding operation so that the transparent sheet 10 constitutes a single piece integral structure.

The overall length of the channels as indicated by the letter L in FIGURE 1 is made exactly equal to ten times the unit length such that if the given unit length is one inch as described for the block 17, the length L will be ten inches.

In using the structure described in FIGURES 1 and 2, the child is essentially taught the basic concept of ten as the radix or base of the decimal system. Thus, with the sheet 10 positioned over the board 20, the child may learn the simple elementary concepts involved in addition and subtraction by positioning various ones of the blocks in the channels in end-to-end relationship. By completely filling one of the channels, the child will know that the sum of the numerical symbols on the blocks used in the channel equals the key number ten. There is thus provided a visual demonstration of the key ten as by the numerical symbols on the blocks as well as a tactual demonstration as by the unique lengths for the particular blocks.

Without further description, it will be quite evident to those skilled in the art the manner in which various manipulations may be made with the blocks in the channels to teach various new math concepts to a child. In this respect, it is to be understood that many more blocks will be provided than as shown in FIGURE 1. In other words, there will be a block corresponding to each digit from one through ten and there may be also provided duplicate blocks.

The embodiment described in FIGURES 1 and 2 would primarily be used in teaching kindergarten or first grade children to familiarize them with the basic concepts of the operation of the educational aid and basic mathematical concepts as described. For children beyond kindergarten such as in the latter part of the first grade or in the second and third grades of school, the educational device illustrated in the embodiment of FIGURE 3 would be employed.

Figure 3:
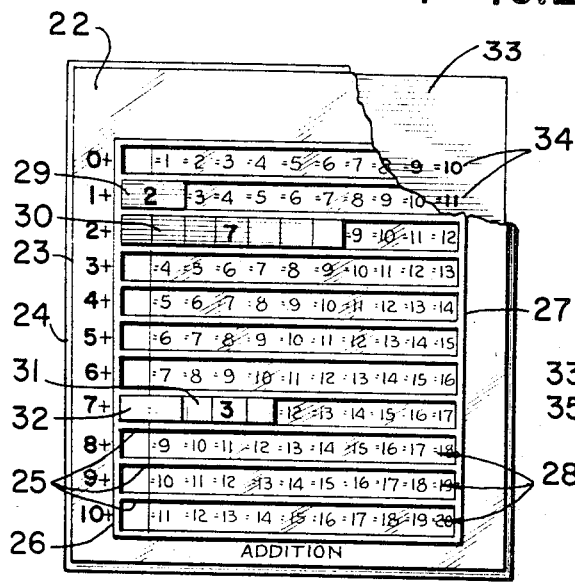
FIGURE 3 is a plan view partly broken away of a second embodiment of the educational aid.

With reference to FIGURE 3, the structure is similar to that of the device of FIGURE 1 but is somewhat expanded. Thus, there is provided a guide means in the form of a transparent sheet 22 having a downwardly extending peripheral wall 23 and laterally extending flange 24. Suitable channels are defined by a plurality of raised portions running longitudinally from left to right along the sheet as indicated at 25 merging into vertical end raised portions such as at 26 and 27. The preferred arrangement is such that eleven parallel channels are defined, the last three of which are indicated by the numeral 28.

As in the embodiment of FIGURE 1, there is provided a plurality of blocks of different lengths corresponding to the numerical symbol imprinted on their top surfaces. Certain ones of these blocks are illustrated in various ones of the channels as at 29, 30, 31 and 32.

Also included in the embodiment of FIGURE 3 is a board 33 having suitable indicia thereon as indicated in the broken-away portion of the showing in FIGURE 3 as at 34. These indicia are visible through the transparent sheet 22 when the sheet 22 is disposed over the board 33 with the downwardly depending peripheral wall 23 nestling the board 33 as described in conjunction with the embodiment of FIGURE 1. In this respect, the dimensions of the board 33 when viewed in plan correspond to the dimensions of the downwardly extending wall portion 23 of the transparent sheet 22. Again, as in the case of the embodiment of FIGURE 1, this dimensioning assures that the board 33 will be fixed in relationship to the transparent sheet 22 and the channels formed thereon.

It will be noted in FIGURE 3 that the indicia on the board 33 is such that it may be viewed directly through the channels unless such indicia are eclipsed by certain ones of the blocks.

As a simple example of the manner in which the structure of FIGURE 3 is used, it will be evident that if a block having a length equal to two times the given unit length is inserted in a channel such as illustrated for the block 29, an addition problem is provided given by the indicia on the board 33 constituting the "1+." This numeral is related to the numerical symbol "2" on the block 29 and the length of the block in relation to the channel is such that it will eclipse the indicia on the board 33 visible through the channel up to the numeral "3." Thus the child is informed that "1+2=3."

Similarly, if a block having a numerical symbol "7" is positioned in a channel such as the channel associated with the indicia "2+" on the board 33, the resulting sum will be indicated as "9."

As a further example, there is illustrated in the lower channel associated with the indicia "7+" blocks 31 and 32. In this case, the block 32 has been turned over to expose a blank side and positioned in end-to-end relationship with the block 31 which is indicated as having a numerical symbol of "3" and thus a length of three unit value lengths.

The equation presented here is "7+( )+3=12." The child will thus attempt to solve the equation by tactually and/or visually determining the proper numerical symbol for the block 32. The answer can be checked by simply turning the block 32 over and observing the actual numerical symbol imprinted thereon.

It will be evident accordingly that the structure lends itself readily to the introduction of algebraic and other new math concepts.

The particular example illustrated in FIGURE 3 discloses indicia on the board 33 relating primarily to addition problems. The board 33 may be turned over and on its bottom surface there may be provided suitable indicia for enabling subtraction operations to be carried out. Similarly, suitable boards dimensioned the same as 33 but including different indicia for exposure through the transparent sheet 22 and for cooperation with the various blocks can include multiplication and division indicia to enable these operations to be taught.

Figure 4:
FIGURE 4 is a perspective view illustrating one surface of one of the blocks employed with the structure of FIGURE 3.
Figure 5:
FIGURE 5 is a perspective view of the opposite surface of the block illustrated in FIGURE 4; and, FIGURE 6 is a fragmentary perspective view partly in cross-section illustrating a further feature of the educational aid.

FIGURES 4 and 5 respectively illustrate the block 32 wherein it will be evident that the top surface 32a clearly displays the integral multiple of the unit length defining the length of the block. The underside as illustrated in FIGURE 5 and indicated at 32b, on the other hand, is blank so that, as described, it may be turned over to form equations. The other blocks are similarly provided with blank bottom surfaces.

Figure 6:
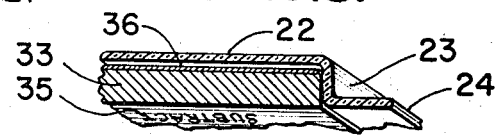

Referring to FIGURE 6, part of the written indicia on board 33 is shown at 35 so that turning over of the board as described provides the new indicia for use with the same transparent sheet 22.

FIGURE 6 also illustrates the manner in which the transparent sheet 22 and cooperating board 33 may be used with an overlay insert. This overlay insert is indicated at 36 and constitutes a thin material having indicia thereon which will eclipse the normal indicia appearing on the top surface of the board 33. It is positioned between the undersurface of the transparent sheet 22 and the top surface of the board 33 and is useful in certain intermediate steps in the teaching of subtraction and the teaching of division. As an example, the negative numbers resulting from subtraction operations may be eliminated in the normal subtraction indicia data included on the board 33 and only positive numbers provided. Similarly, when a division indicia board is employed, fractions may be eliminated by the use of an overlay insert such as indicated at 36.

From the foregoing description, it will be evident that the present invention has provided a greatly improved educational aid for teaching mathematics, particularly useful for kindergarten to third grade children. Not only is the overall structure highly attractive as a consequence of color coding of the various individual blocks, but in addition, there is provided multisensory relationships in that the blocks themselves are of physical lengths corresponding to their numerical value and have a specific numerical symbol and color associated with their numerical value.

The entire device is easily manufactured since it comprises only the two basic components in the form of the transparent sheet and the indicia board together with the various blocks, which may be used with either the embodiment of FIGURE 1 or the embodiment of FIGURE 3. Accordingly, all the various objects set forth have been fully realized by this invention.

While only certain operations relating to arithmetical problems have been set forth, it will be evident to those skilled in the art that various other manipulations and operations may be carried out with the basic components shown. The educational aid for teaching mathematics is therefore not to be thought of as limited to the specific embodiments or examples set forth merely for illustrative purposes.

What is claimed is:

1. An educational aid for teaching mathematics comprising, in combination: a supporting frame in the form of a sheet of transparent material having elongated raised portions on its top surface to provide guide means defining at least one longitudinal channel of given length; a plurality of individual blocks, each of width corresponding to the width of said channel and of a length defined by an integral multiple of a given unit length, said channel having a length also defined by an integral multiple of said given unit length; and a base insert having indicia on its top surface and positionable under said sheet so that said indicia are visible through said sheet whereby certain ones of said blocks may be positioned in end to end relationship in said channel in a manner to fill completely said channel or leave a remaining space through which at least one of the indicia on said base insert is visible and which is equal in length to an integral multiple of said given unit length.

2. The subject matter of claim 1, in which said transparent material includes a downwardly extending peripheral wall merging into an outwardly extending peripheral flange, said base insert comprising a base board dimensioned to be nestled within said downwardly extending peripheral wall of said sheet with its bottom surface substantially flush with said flange and its top surface engaging the bottom surface of said sheet such that said board is held in a fixed position relative to said sheet.

3. The subject matter of claim 2, in which said board includes indicia on its bottom surface such that said board may be turned over and repositioned within said downwardly extending peripheral wall of said sheet to render said latter mentioned indicia visible through said sheet.

4. The subject matter of claim 1, in which each of said blocks includes a numerical symbol on its top surface equal to said first-mentioned integral multiple defining its length.

5. The subject matter of claim 4, in which the bottom surface of each of said plurality of blocks is blank such that turning over of a block when positioned in said channel hides its numerical symbol.

6. The subject matter of claim 4, in which said elongated raised portions define two parallel channels of the same dimensions on the top surface of said sheet, each of said channels having a length of ten times said given unit length.

7. The subject matter of claim 4, in which said elongated raised portions define eleven parallel channels of the same dimensions on the top surface of said sheet, each of said channels having a length of eleven times said given unit length.

8. The subject matter of claim 2, including a thin overlay insert having given indicia thereon and of dimensions when viewed in plan corresponding to the dimensions of said board whereby it may be inserted between the top surface of said board and the bottom surface of said sheet to eclipse the indicia on the top surface of said board and render visible its own said given indicia through said sheet.

9. An educational aid for teaching mathematics comprising, in combination: a sheet of transparent material including portions extending out of the plane of its remaining portions to define at least one longitudinal channel; a plurality of blocks each of a width corresponding to the width of said channel and of a length defined by an integral multiple of a given unit length, said channel having a length also defined by an integral multiple of said given unit length at least as large in value as the largest integral multiple defining the length of the longest of said blocks; and a board having indicia on its top surface for cooperation with said sheet such that when said sheet is positioned over the top surface of said board, said indicia is visible through said sheet whereby certain ones of said blocks may be positioned in said channel and visually related to said indicia.

10. The subject matter of claim 9, in which each of said blocks includes a numerical symbol on its top surface equal to said first-mentioned integral multiple defining its length whereby said numerical symbols on said blocks may be related to said indicia on said board.

References Cited

UNITED STATES PATENTS 2,494,469  1/1950  Booth _____ 35—31

EUGENE R. CAPOZIO, *Primary Examiner.*

W. H. GRIEB, *Assistant Examiner.*